United States Patent
Lin et al.

(10) Patent No.: US 8,737,717 B2
(45) Date of Patent: May 27, 2014

(54) METHOD AND APPARATUS FOR DEFECT IDENTIFICATION

(75) Inventors: Mei-Chun Lin, Taichung (TW);
Ching-Fang Yu, Hsinchu (TW);
Ting-Hao Hsu, Hsinchu (TW);
Sheng-Chi Chin, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 205 days.

(21) Appl. No.: 13/455,584

(22) Filed: Apr. 25, 2012

(65) Prior Publication Data
US 2013/0287287 A1    Oct. 31, 2013

(51) Int. Cl.
*G06K 9/00*    (2006.01)

(52) U.S. Cl.
USPC ........... 382/144; 382/141; 382/145; 382/149; 382/152; 382/154

(58) Field of Classification Search
USPC .......... 382/106, 108, 141, 144–152, 154, 286
See application file for complete search history.

(56) References Cited

U.S. PATENT DOCUMENTS

| | | | |
|---|---|---|---|
| 6,028,673 A * | 2/2000 | Nagasaki et al. | 356/608 |
| 6,353,222 B1 * | 3/2002 | Dotan | 250/310 |
| 2004/0052411 A1 * | 3/2004 | Qian et al. | 382/144 |
| 2007/0031026 A1 * | 2/2007 | Kurihara et al. | 382/149 |
| 2010/0154521 A1 * | 6/2010 | Budach | 382/144 |
| 2010/0290696 A1 * | 11/2010 | Jeong et al. | 382/147 |
| 2011/0271239 A1 | 11/2011 | Lu et al. | |
| 2012/0242824 A1 * | 9/2012 | Takahashi et al. | 348/86 |

FOREIGN PATENT DOCUMENTS

WO    WO 2011070750 A1 *    6/2011

OTHER PUBLICATIONS

Sergio David Serulnik, Jacob Cohen, Boris Sherman, and Ariel Ben-Porath, "Automatic Defect Classification using Topography Map from SEM Photometric Stereo", Proceedings of SPIE Data Analysis and Modeling for Process Control, vol. 5378, 2004, pp. 124-133.*
Unpublished U.S. Appl. No. 13/414,183, filed Mar. 7, 2012 entitled "Method and Apparatus for Enhanced Optical Proximity Correction," 29 pages.

* cited by examiner

*Primary Examiner* — Eric Rush
(74) *Attorney, Agent, or Firm* — Haynes and Boone, LLP (57) ABSTRACT

A method of identifying defects including producing, with an imaging system, an original image of a fabricated article having a feature thereon, the feature having an intended height and extracting a contour image from the original image, the contour image having an outline of those portions of the feature having a height approximate to the intended height. The method also includes producing a simulated image of the article based upon the contour and creating a defect image based on the differences between the simulated image and the original image, the defect image including any portions of the feature having a height less than the intended height.

20 Claims, 9 Drawing Sheets

METHOD AND APPARATUS FOR DEFECT IDENTIFICATION

BACKGROUND

The semiconductor integrated circuit (IC) industry has experienced rapid growth. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. Such scaling down has also increased the complexity of processing and manufacturing ICs and, for these advances to be realized, similar developments in IC manufacturing are needed.

For example, in semiconductor technologies, a plurality of photomasks (masks) are formed with predesigned IC patterns. The plurality of masks are used during lithography processes to transfer the predesigned IC patterns to multiple semiconductor wafers. The predesigned IC patterns formed on the masks are master patterns. Accordingly, any photomask defects will be transferred to multiple semiconductor wafers, causing yield issues. High precision processes are therefore utilized during mask fabrication, and fabricated masks are inspected for defects after mask fabrication. Conventional mask inspections are performed with scanning electron microscope systems such as electron-beam (e-beam) inspection tools. These imaging systems may produce images of defects on photomasks, but may not efficiently differentiate between different types of defects, such as full-height defects and non-full-height defects. Thus, although existing approaches have been satisfactory for their intended purposes, they have not been entirely satisfactory in all respects.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

It is understood that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
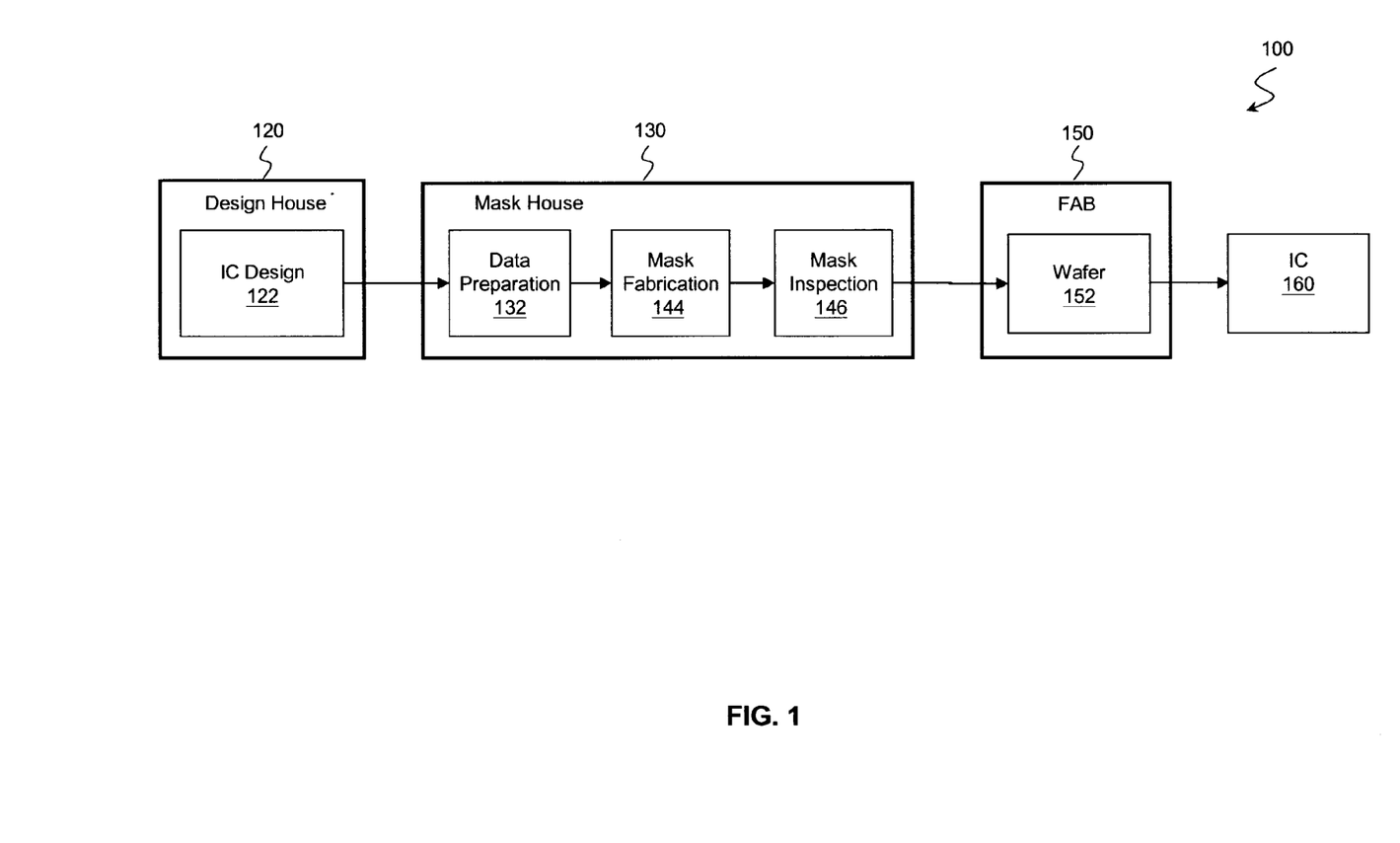
FIG. 1 is a simplified block diagram of an embodiment of an integrated circuit (IC) manufacturing system and an associated IC manufacturing flow.

FIG. 1 is a simplified block diagram of an embodiment of an integrated circuit (IC) manufacturing system 100 and an IC manufacturing flow associated with the IC manufacturing system. The IC manufacturing system 100 includes a plurality of entities, such as a design house 120, a mask house 130, and an IC manufacturer 150 (i.e., a fab), that interact with one another in the design, development, and manufacturing cycles and/or services related to manufacturing an integrated circuit (IC) device 160. The plurality of entities are connected by a communications network, which may be a single network or a variety of different networks, such as an intranet and the Internet, and may include wired and/or wireless communication channels. Each entity may interact with other entities and may provide services to and/or receive services from the other entities. The design house 120, mask house 130, and IC manufacturer 150 may be a single entity or separate entities.

The design house (or design team) 120 generates an IC design layout 122. The IC design layout 122 includes various geometrical patterns designed for an IC product, based on a specification of the IC product to be manufactured. The geometrical patterns correspond to patterns of metal, oxide, or semiconductor layers that make up the various components of the IC device 160 to be fabricated. The various layers combine to form various IC features. For example, a portion of the IC design layout 122 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. The design house 120 implements a proper design procedure to form the IC design layout 122. The design procedure may include logic design, physical design, and/or place and route. The IC design layout 122 is presented in one or more data files having information of the geometrical patterns. For example, the IC design layout 122 can be expressed in a GDSII file format (or DFII file format).

The mask house 130 uses the IC design layout 122 to manufacture one or more masks to be used for fabricating the various layers of the IC product according to the IC design layout 122. The mask house 130 performs mask data preparation 132, where the IC design layout 122 is translated into a form that can be physically written by a mask writer. Data preparation 132 may include optical proximity correction (OPC) and a lithography process check (LPC) to compensate for image errors and simulate mask fabrication. The mask house 130 also performs mask fabrication 144, where the design layout prepared by the mask data preparation 132 is modified to comply with a particular mask writer and/or mask manufacturer and is then fabricated. In the present embodiment, the mask data preparation 132 and mask fabrication 144 are illustrated as separate elements, however, the mask data preparation 132 and mask fabrication 144 can be collectively referred to as mask data preparation.

During mask fabrication 144, a mask or group of masks are fabricated based on the modified IC design layout. For example, an electron-beam (e-beam) or a mechanism of multiple e-beams is used to form a pattern on a mask (photomask or reticle) based on the modified IC design layout. The mask can be formed in various technologies. In one embodiment, the mask is formed using binary technology. In the present embodiment, a mask pattern includes opaque regions and transparent regions. A radiation beam, such as an ultraviolet (UV) beam, used to expose the image sensitive material layer (e.g., photoresist) coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM as known in the art.

After a mask has been fabricated, the mask house performs a mask inspection 146 to determine if the fabricated mask includes any defects, such as full-height and non-full-height defects. Different types of defects are described in association with FIGS. 3 and 4 and a defect identification process is described in association with FIGS. 5-10. If any defects are detected, the mask may be cleaned or the IC design may be modified further depending on the types of defects detected.

It should be understood that the above description of the mask data preparation 132 has been simplified for the purposes of clarity, and data preparation may include additional features such as a logic operation (LOP) to modify the IC design layout according to manufacturing rules, a retarget process (RET) to modify the IC design layout to compensate for limitations in lithographic processes used by IC manufacturer 150, and a mask rule check (MRC) to modify the IC design layout to compensate for limitations during mask fabrication 144. Additionally, the processes applied to the IC design layout 122 during mask fabrication 144 and mask inspection 146 may be executed in a variety of different orders and may include a variety of different and/or additional steps.

The IC manufacturer 150, such as a semiconductor foundry, uses the mask (or masks) fabricated by the mask house 130 to fabricate the IC device 160. The IC manufacturer 150 is a IC fabrication business that can include a myriad of manufacturing facilities for the fabrication of a variety of different IC products. For example, there may be a manufacturing facility for the front end fabrication of a plurality of IC products (i.e., front-end-of-line (FEOL) fabrication), while a second manufacturing facility may provide the back end fabrication for the interconnection and packaging of the IC products (i.e., back-end-of-line (BEOL) fabrication), and a third manufacturing facility may provide other services for the foundry business. In the present embodiment, a semiconductor wafer is fabricated using the mask (or masks) to form the IC device 160. The semiconductor wafer includes a silicon substrate or other proper substrate having material layers formed thereon. Other proper substrate materials include another suitable elementary semiconductor, such as diamond or germanium; a suitable compound semiconductor, such as silicon carbide, indium arsenide, or indium phosphide; or a suitable alloy semiconductor, such as silicon germanium carbide, gallium arsenic phosphide, or gallium indium phosphide. The semiconductor wafer may further include various doped regions, dielectric features, and multilevel interconnects (formed at subsequent manufacturing steps). The mask may be used in a variety of processes. For example, the mask may be used in an ion implantation process to form various doped regions in the semiconductor wafer, in an etching process to form various etching regions in the semiconductor wafer, in a deposition process (e.g., chemical vapor deposition (CVD) or physical vapor deposition (PVD)) to form a thin film in various regions on the semiconductor wafer, and/or other suitable processes.

Figure 2:
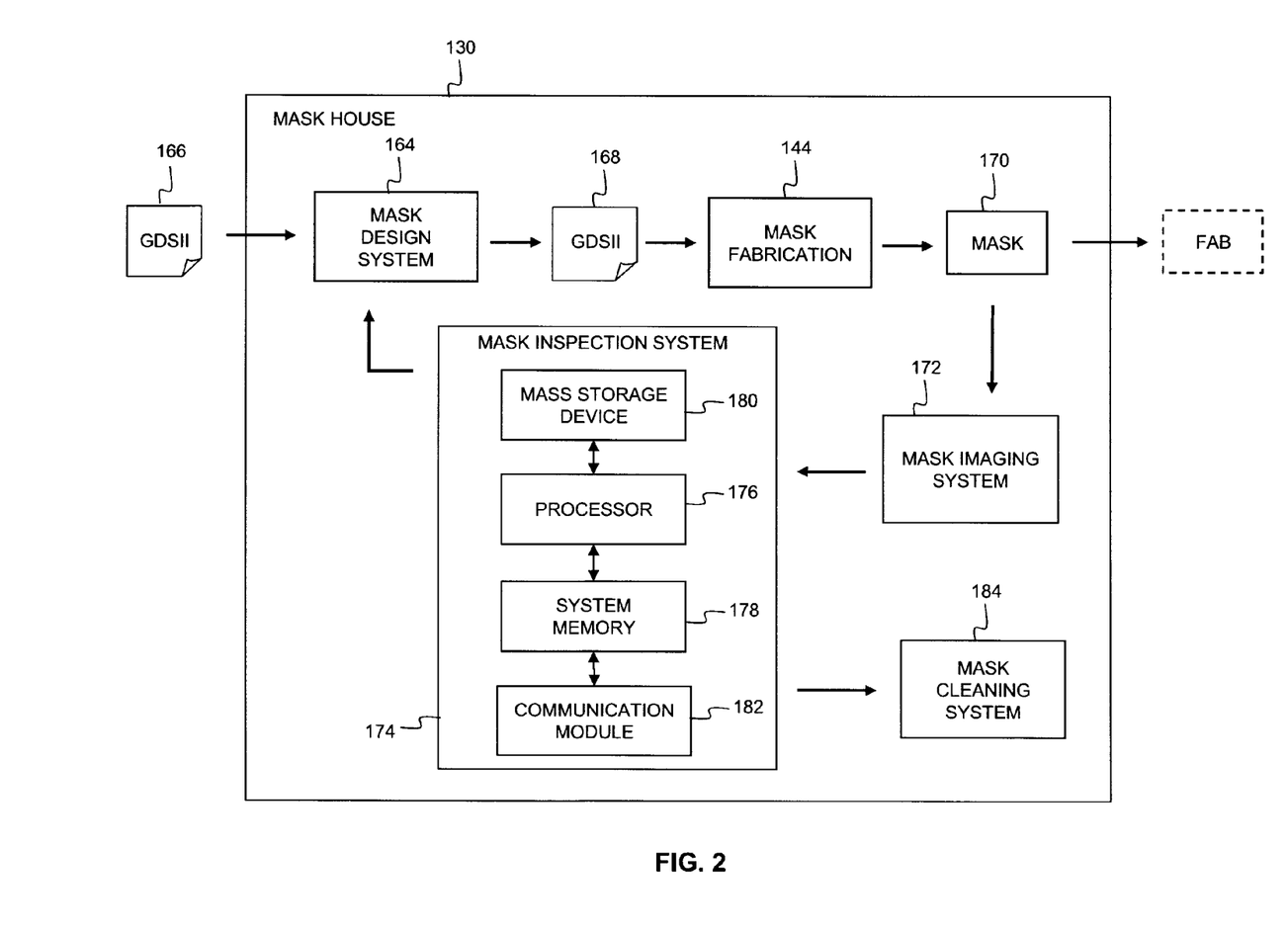
FIG. 2 is a more detailed block diagram of the mask house shown in FIG. 1 according to various aspects of the present disclosure.

FIG. 2 is a more detailed block diagram of the mask house 130 shown in FIG. 1 according to various aspects of the present disclosure. In the illustrated embodiment, the mask house 130 includes various systems that perform the functionality described in association with mask data preparation 132, mask fabrication 144, and mask inspection 146 of FIG. 1.

In more detail, the mask house 130 includes a mask design system 164 that is an information handling system such as a computer, server, workstation, or other suitable device. The mask design system 164 is configured to manipulate the IC design layout 122 according to a variety of design rules and limitations before it is transferred to a mask by mask fabrication 144. For example, in one embodiment, OPC and LPC may be implemented as software instructions executing on the mask design system 164. The mask design system 164 receives a first GDSII file 166 containing the IC design layout 122 from the design house 120. After the mask data preparation 132 is complete, the mask design system 164 transmits a second GDSII file 168 containing the a modified IC design layout to mask fabrication 144. In alternative embodiments, the IC design layout may be transmitted between the components in IC manufacturing system 100 in alternate file formats such as DFII, CIF, OASIS, or any other suitable file type. Mask fabrication 144 produces a mask 170.

The mask house 130 further includes a mask imaging system 172 that is operable to produce an image of the mask for inspection purposes. In the illustrated embodiment, the mask imaging system 172 is a scanning electron microscope (SEM) adapted to capture SEM images of the mask 170. In some embodiments, the mask imaging system 172 may include an electron-beam (e-beam) mask inspector and/or an SEM system that is configured to detect critical dimension of feature on the mask (i.e., a CD SEM system). In other embodiments, the mask imaging system 172 may include various wafer scanning systems other than an SEM. For example, an optical microscope system, a scanning probe microscope system, a laser microscope system, a transmission electron microscope system, a focus ion beam microscope system, or other suitable optical imaging systems may be used instead of an SEM to produce an image of the mask 170.

The mask house 130 also includes a mask inspection system 174 configured to inspect images of the mask 170 produced by the mask imaging system 172. In the illustrated embodiment, the mask inspection system is an information handling system such as a computer, server, workstation, or other suitable device. The system 174 includes a processor 176 that is communicatively coupled to a system memory 178, a mass storage device 180, and a communication module 182. The system memory 178 provides the processor 176 with non-transitory, computer-readable storage to facilitate execution of computer instructions by the processor. Examples of system memory may include random access memory (RAM) devices such as dynamic RAM (DRAM), synchronous DRAM (SDRAM), solid state memory devices, and/or a variety of other memory devices known in the art. Computer programs, instructions, and data are stored on the mass storage device 180. Examples of mass storage devices may include hard discs, optical disks, magneto-optical discs, solid-state storage devices, and/or a variety other mass storage devices known in the art. The communication module 182 is operable to receive images from the mask imaging system 172 and communicate information such as defect information with the other components in the mask house 130. Examples of communication modules may include Ethernet cards, 802.11 WiFi devices, cellular data radios, and/or other suitable devices known in the art.

The mask inspection system 174 is configured to identify and classify a variety of defects on the surface of mask 170 as captured in the images produced by the mask imaging system 172. For instance, the mask inspection system 174 includes instructions to convert SEM images into contour images, compare various SEM images to isolate mask defects, classify identified defects, and other processes related to mask defect identification. Further, if the mask inspection system 174 determines that mask defects identified in the SEM images are due to particles on the mask surface, the mask 170 may be sent to a mask cleaning system 184 before it is transported to the fab 150. Or, if the mask inspection system 174 determines that mask defects identified in the SEM images are due to structural defects in the mask features, the system 174 may further determine whether the structural defect is due to fabrication error or a design error. In the case of the latter, the mask may be discarded and the defect information may be relayed to the mask design system 164 so that the IC design layout may be adjusted. It is understood that the mask inspection system 174 and the mask house 130 may include additional and/or different components in alternative embodiments.

Figure 3:
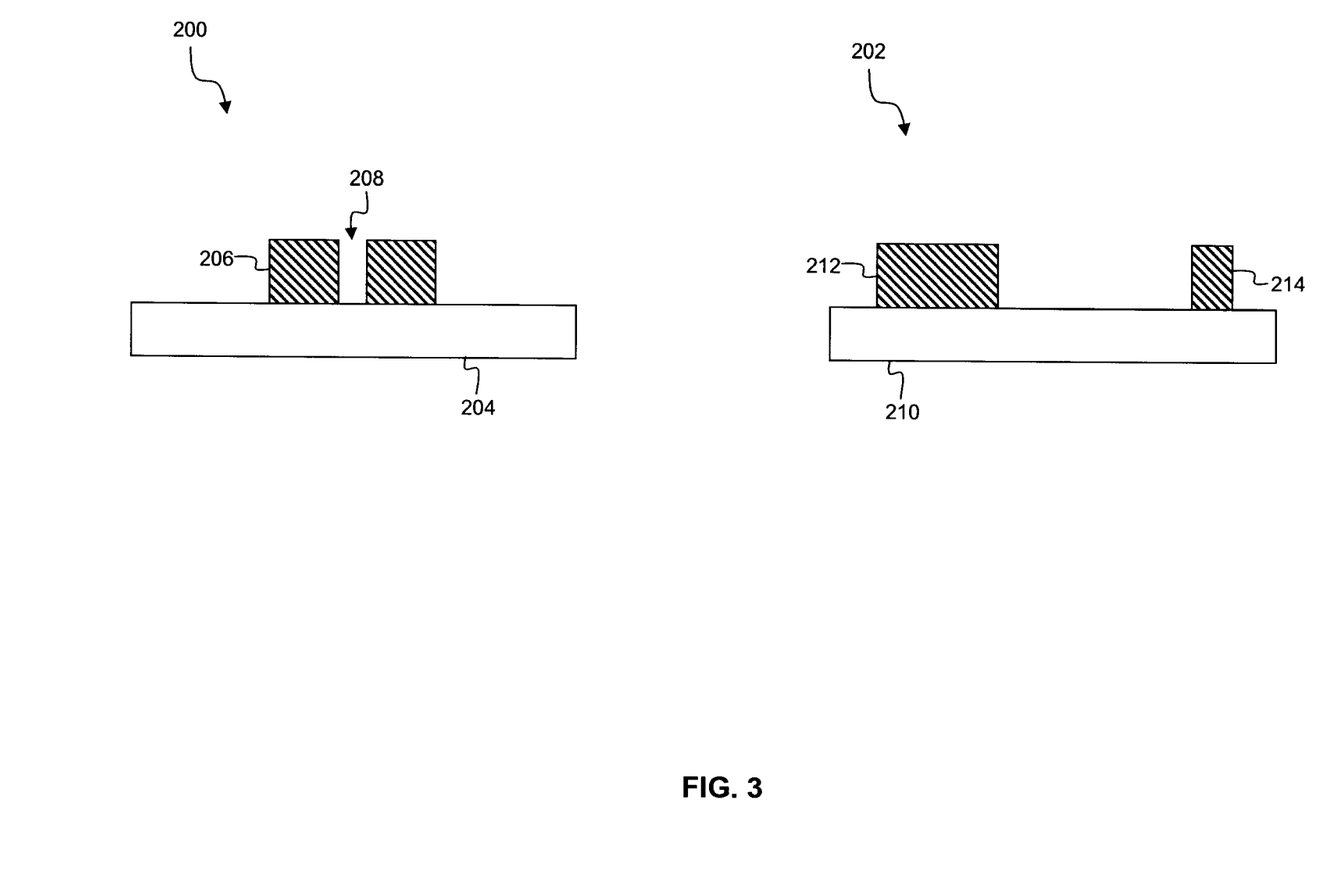
FIG. 3 illustrates example manufactured photomasks with full-height defects.

FIG. 3 illustrates example fabricated photomasks with full-height defects. More specifically, FIG. 3 illustrates a fabricated photomask 200 and a fabricated photomask 202 that each include a full-height defect. Photomask 200 includes a substrate 204 and a feature 206. In one embodiment, the substrate 204 may be a low-thermal-expansion material (LTEM) such as quartz and the feature 206 may include a plurality of layers such as a reflective multilayer (ML) coating, an absorber layer, and a buffer layer. As shown in FIG. 3, the feature 206 is defective in that a portion of the feature has been removed during fabrication that should not have been removed. Specifically, the feature 206 includes an opening 208 that extends to the substrate 204. This defect 208 may be referred to as a pin hole defect and is classified as a full-height defect because none of the material of the feature remains in the opening. That is, the pin hole defect 208 extends through the full height of the feature. The fabricated photomask 202 includes a substrate 210 and a feature 212. Additionally, as mentioned above, the photomask also includes a full-height defect that is a residue defect 214. Specifically, the material comprising the residue defect 214 should have been removed during fabrication but was not and thus the defect extends the full height of the feature 212. Further, the pin hole defect 208 in mask 200 and the residue defect 214 in the mask 202 are considered hard defects in that they are structural defects that are not correctable through cleaning.

Figure 4:
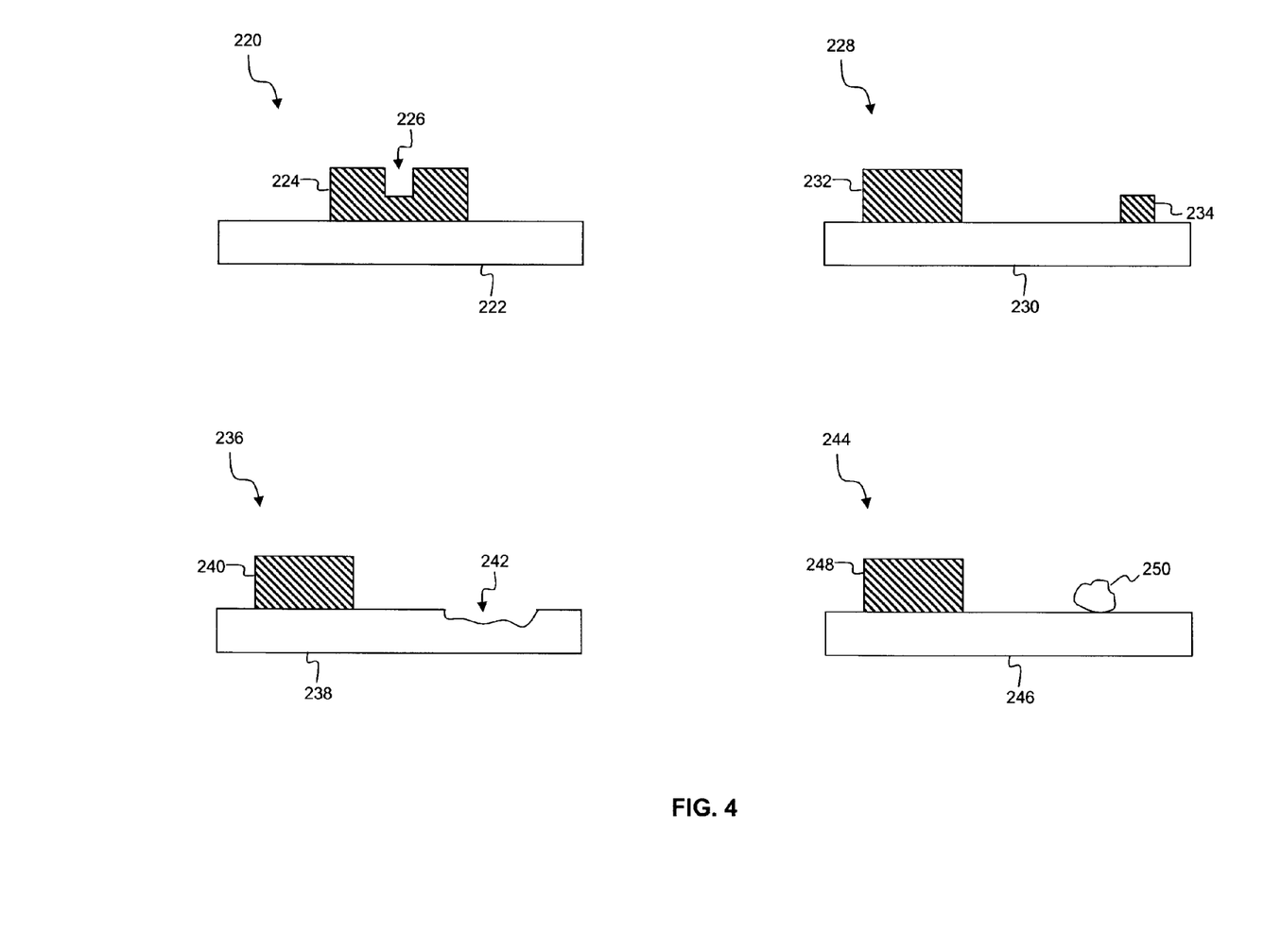
FIG. 4 illustrates example manufactured photomasks with non-full-height defects.

FIG. 4 illustrates examples of fabricated photomasks with non-full-height defects. A first example photomask 220 with a substrate 222 includes a feature 224 that is defective in that a portion of the feature was removed during fabrication that should not have been removed. Specifically, the feature 224 includes a pin hole defect 226 that is a non-full height defect because it extends through only a portion of the feature. A second example photomask 228 with a substrate 230 includes a feature 232 and a half-etching defect 234 that was only partially etched away during fabrication. The half-etching defect 234 is a non-full-height defect because it does not extend to the full height of the feature 232. A third example photomask 236 includes a substrate 238, a feature 240, and a substrate damage defect 242. The substrate damage defect 242 is caused by inadvertent removal of the substrate during fabrication and is considered a non-full-height defect. A fourth example photomask 244 includes a substrate 246, a feature 248, and a particle defect 250. In the illustrated embodiment, the particle defect 250 is a foreign particle disposed on the substrate 246, and is considered a non-full-height defect. In other embodiments, a particle defect may be disposed on the feature and/or may comprise a plurality of particles. Additionally, the pin hole defect 226, the residue defect 234, and the substrate damage defect 242 are considered to be hard defects because they are structural defects that are not correctable through cleaning. In contrast, the particle defect 250 is considered to be a soft defect because it is removable through cleaning. Typically, particles defects and other photomask contamination are non-full-height defects.

Figure 5:
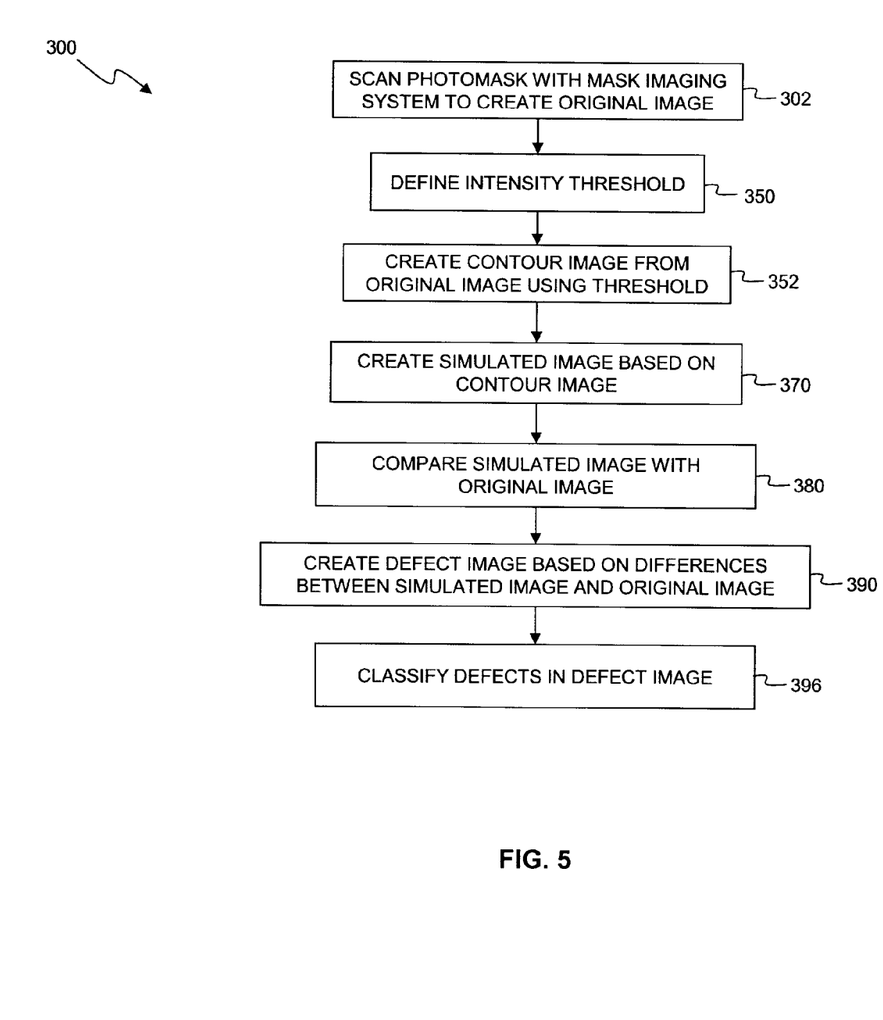
FIG. 5 is a high-level flowchart of a method of identifying photomask defects according to various aspects of the present disclosure.

Referring now to FIG. 5, illustrated is a high-level flow-chart of a method 300 of identifying photomask defects according to various aspects of the present disclosure. In the illustrated embodiment, the method 300 is carried out by the mask imaging system 172 and mask inspection system 174 shown in FIG. 2. Further, in one embodiment, portions of the method 300 may be implemented as computer-readable instructions stored on the mass storage device 180 and executed by the processor 176 of the mask inspection system 174. In general, the method 300 identifies defects in fabricated photomasks via images of the masks produced by the mask imaging system 172. Traditional mask inspection systems may have been operable to identify full-height-defects but lacked the ability to reliably detect non-full-height defects, such as soft defects. The method 300, however, is capable of isolating non-full-height defects in an SEM image, such as the example defects illustrated in FIG. 4. For instance, the method 300 identifies both soft defects (e.g., particle defects) and non-full-height hard defects (e.g., half etching defects, etc) but, in the illustrated embodiment, does not identify full-height defects. Further, the method 300 in FIG. 5 is a high-level overview and details associated with each block in the method will be described in association with the subsequent figures in the present disclosure.

Figure 6:
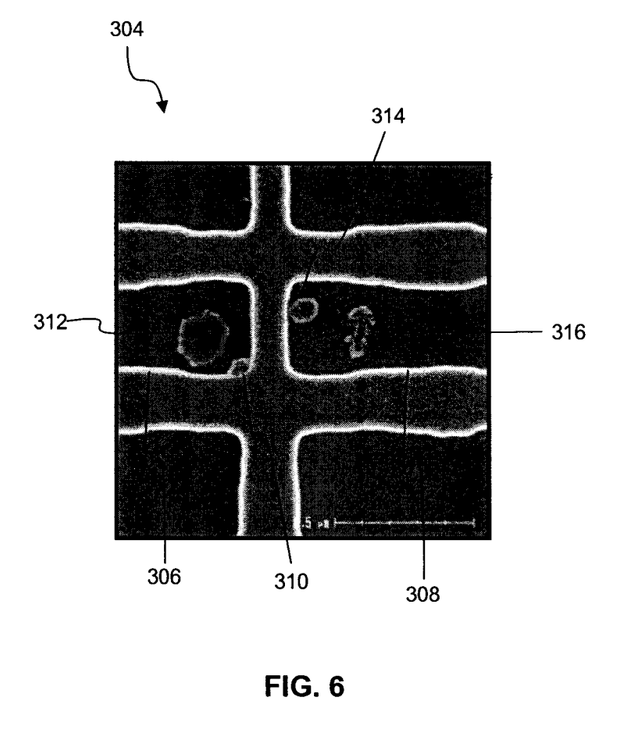
FIG. 6 is an example SEM image of the surface of a photomask.

The method 300 of identifying photomask defects begins at block 302 where a photomask is scanned by an imaging system to create an original scanning electron microscope (SEM) image of the photomask. The imaging system may be an e-beam inspection tool system, CD SEM imaging system, or some other imaging system capable of discerning individual features on a photomask or other fabricated article with microscopic features, such as mask imaging system 172 in FIG. 2. The SEM image created in block 302 depicts the surface of the photomask including normally-formed patterned features, defective patterned features, and particles of contamination disposed thereon. In that regard, FIG. 6 is an example SEM image 304 of the surface of a photomask. For reference of scale, the features depicted in image 304 may be on a micrometer ($\mu$m) scale. The image 304 is a gray scale image where features with different heights are depicted with different shades of gray. For instance, the feature 306 is a normally formed feature having an height intended by the mask design (i.e., it is full height). The edges of feature 306 are depicted by a light gray outline that indicates a change of full height on the surface of the mask. Other full height features, such as feature 308, have edges depicted by the same shade of light gray.

The SEM image 304 also depicts a number of defects on the surface of the depicted photomask. For example, as shown in FIG. 6, the feature 306 includes a half-etching defect 310. During fabrication, a portion of the feature 306 was inadvertently partially etched away, leaving a "step" that has a height less than the intended (or full) height of the feature (i.e., it is a non-full-height defect). As such, the outer edge of the defect 310 is depicted in a darker shade of gray than the rest of the feature's edge. The SEM image 304 additionally depicts particle defects 312, 314, and 316 that are particles of contamination disposed on the surface of the mask. The edges of the particle defects 312, 314, and 316 are depicted in a darker shade of gray than the rest of the feature's edge, and thus they are considered non-full-height defects.

Referring back to FIG. 5, the method 300 proceeds to block 350 where an intensity threshold is defined. In the illustrated embodiment, the intensity threshold is a gray scale value associated with the SEM image 304 created in block 302, and thus represents a specific height of features on the depicted photomask. In some embodiments, the intensity threshold is defined to represent a height somewhat less than the full intended height of photomask features, and, in some embodiments, may be defined to be within about 20% of the full height (i.e., it approximately represents the full height). As will be described in association with block 352, the intensity threshold is used to define a contour image of the SEM image 304.

Figure 7:
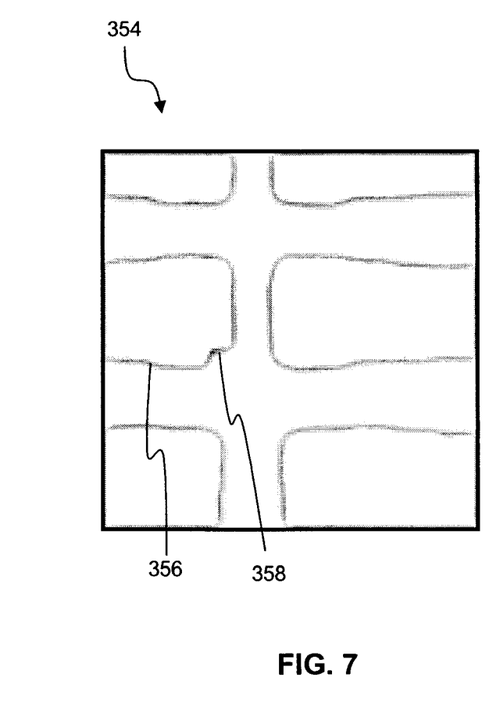
FIG. 7 illustrates a contour image extracted from the SEM image of FIG. 6.

After the intensity threshold has been defined, the method 300 proceeds to block 352 where a contour image is created from the SEM image 304 based on the intensity threshold. In this regard, FIG. 7 illustrates a contour image 354 extracted from the SEM image 304. The contour image 354 includes outlines of those features in the SEM image 304 that are depicted with a gray scale value above the intensity threshold. That is, edges of features that exceed the height represented by the intensity threshold are included in the contour image 354. For instance, an outline 356 of the feature 306 is depicted in the contour image 354 because the gray scale value representing its edges exceeded the intensity threshold. Further, an inside edge 358 of the half-etching defect 310 is represented on the contour image 354 but its outside edge is not represented on the contour image because the inside edge meets the threshold value but outside edge does not. Additionally, as shown in FIG. 7, none of the particle defects 312, 314, or 316, are represented on the contour image 354 because none of their edges were represented on the SEM image 304 by a gray scale value that met the intensity threshold. Thus, the contour image 354 includes outlines of features that are approximately full height. Further, in some embodiments, an edge detector algorithm may be used to generate the contour image 354.

Figure 8:
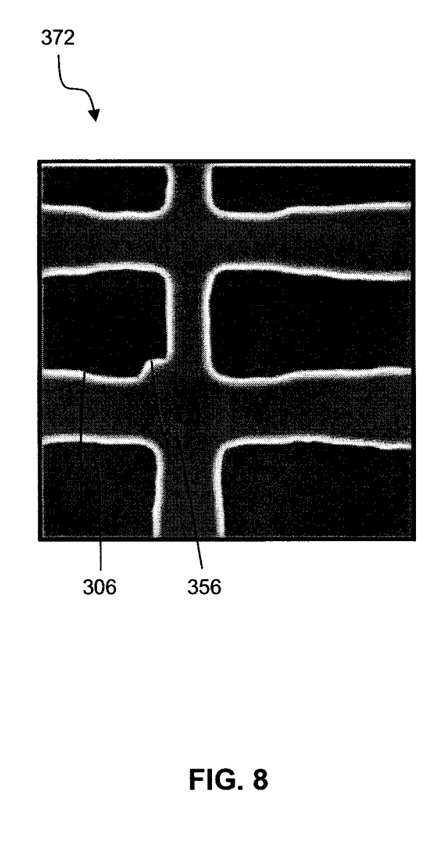
FIG. 8 illustrates a simulated SEM image based on the contour image of FIG. 7.

Referring back to FIG. 5, the method proceeds to block 370 after the contour image has been extracted. In block 370, a simulated SEM image is created from the contour image created in block 370. In that regard, FIG. 8 illustrates a simulated SEM image 372 based on the contour image 354. Specifically, the simulated SEM image 332 is composed of different shades of gray (i.e., different gray scale values) that depict only those features outlined in the contour image 354. In other words, the simulated SEM image 372 depicts a hypothetical photomask similar to the fabricated photomask being inspected but with only those features that are approximately full height. For example, the simulated SEM image 372 depicts feature 306 but only those portions that are approximately full height, and thus does not depict the portion of the feature that is half-etched (i.e., half-etching defect 310). Instead, the feature 306 includes only the inside edge 356 of the half-etching defect 310.

Figure 9:
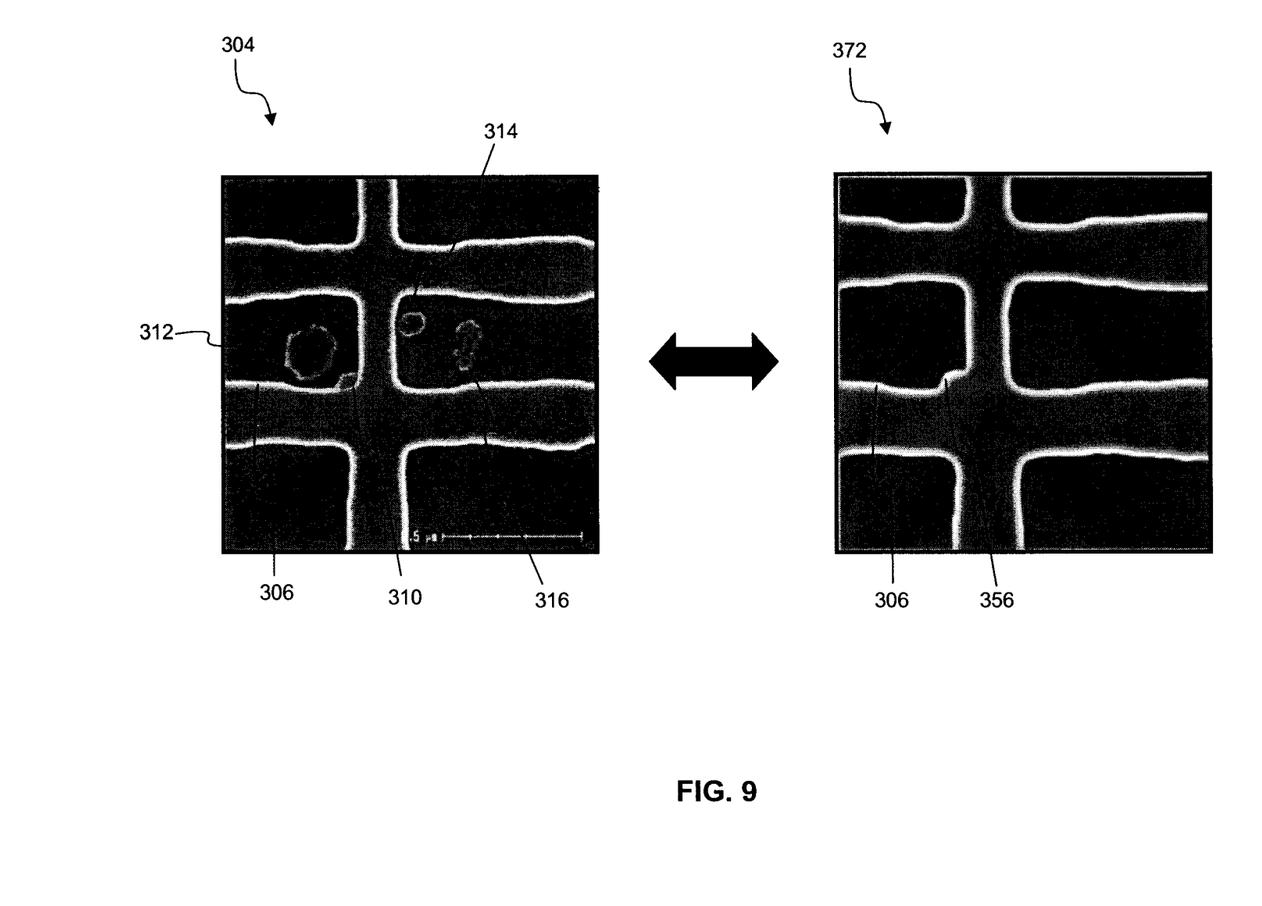
FIG. 9 illustrates a comparison of the simulated SEM image of FIG. 8 to the SEM image of FIG. 6.

Next, in block 380 of method 300, the simulated SEM image 372 is compared to the SEM image 304. In that regard, FIG. 9 illustrates a comparison of the simulated SEM image 372 to the SEM image 304. In one embodiment, any differences between the SEM image and the SEM image are isolated by a comparison of their gray scale values. Specifically, a gray scale value of each pixel in the simulated SEM image 372 is subtracted from a gray scale value of a corresponding pixel in the SEM image 304 (i.e., a pixel-by-pixel comparison is performed). The resulting gray scale values may be used to form a comparison image, as will be described in association with block 390 of method 300.

Figure 10:
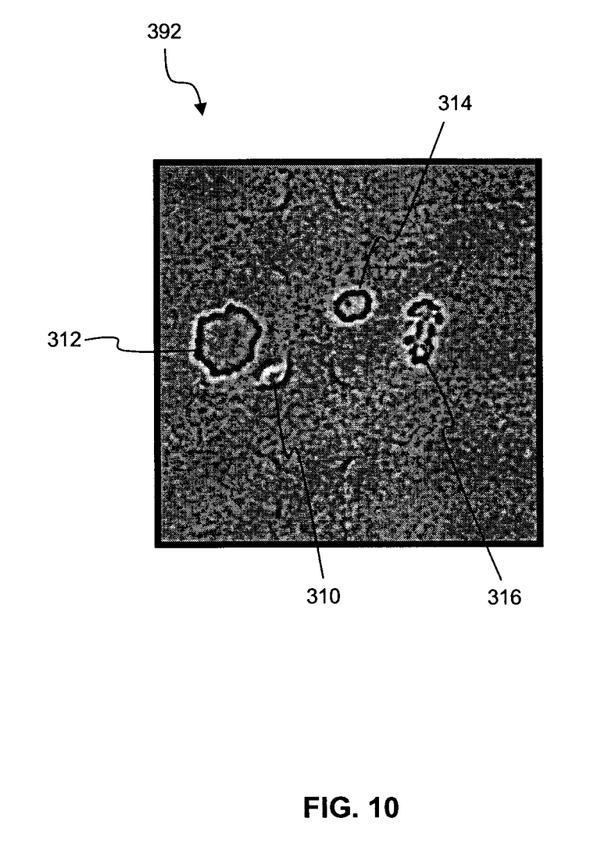
FIG. 10 illustrates a defect image resulting from the difference between the SEM image of FIG. 6 and the simulated SEM image of FIG. 8.

Referring back to FIG. 5, the method 300 next proceeds to block 390, where a defect image based on the differences between the SEM image 304 and the simulated SEM image 372 is created. Specifically, a defect image is formed where each pixel in the defect image is defined by the difference in gray scale value between the corresponding pixels of the SEM image and the simulated SEM image. In that regard, FIG. 10 illustrates a defect image 392 formed by the gray scale values resulting from the difference in the SEM image 304 gray scale values and the simulated SEM image 372 gray scale values. As such, the defect image 392 includes just those portions includes the portions of the SEM image that did not meet the intensity threshold, and thus are not represented in the simulated SEM image. In other words, the defect image 392 depicts those portions of the fabricated photomask that have a height approximately less than full intended height of the main features. Even more specifically, the defect image 392 depicts the non-full-height defects on the photomask, but does not depict any full height features or full-height defects. Thus, in the illustrated embodiment, the method 300 distinguishes full-height defects from non-full-height defects such as soft defects. As shown in FIG. 9, the defect image 392 depicts non-full-height defects such as half-etching defect 310 and particle defects 312, 314, and 316, but does not depict any of the full-height features of the fabricated photomask such as feature 306.

Referring back to FIG. 5, after any non-full-height defects on the fabricated photomask are identified in the defect image 392, the method 300 proceeds to block 396 where the identified defects are classified. Specifically, in one embodiment, a mask inspection system such as mask inspection system 174 analyzes the defects isolated in the defect image 392 to classify the defects into different categories such as soft defects and hard defects. In such an embodiment, the mask inspection system 174 may include defect classification algorithms on the mass storage device 180 that are operable to classify defects without human assistance. Upon such classification, operators in the mask house can determine which remedial action is appropriate for the defective photomask. For example, if all of the defects identified on the defect image are classified as soft defects, the photomask may be sent to a mask cleaning system such as mask cleaning system 184 so that the contamination may be removed.

It is understood that method of identifying defects on a fabricated article such as a photomask is simply an example and in alternative embodiments, additional and/or different steps may be included in the method. Further, although the method 300 as described above is directed towards identifying defects on a photomask, the method 300 is equally applicable to other fabricated articles such as an integrated circuit on a semiconductor wafer. For instance, the method 300 may be employed to identify structurally defective transistors in an integrated circuit or identify particles of contamination disposed on the integrated circuit.

Further, the method 300 of identifying defects on a fabricated article of the illustrated embodiment is designed to be executed on any computing architecture, such as the systems described in association with mask house 130 of FIG. 2. For example, the method 300 may be executed on a single computer, local area networks, client-server networks, wide area networks, internets, hand-held and other portable and wireless devices and networks. Such architecture can take the form of an entirely hardware embodiment, an entirely software embodiment, or an embodiment containing both hardware and software elements. Hardware generally includes at least processor-capable platforms, such as client-machines (also known as personal computers or servers), and hand-held processing devices (such as smart phones, personal digital assistants (PDAs), or personal computing devices (PCDs), for example. Hardware can include any physical device that is capable of storing machine-readable instructions, such as memory or other data storage devices. Other forms of hardware include hardware sub-systems, including transfer devices such as modems, modem cards, ports, and port cards, for example. Software generally includes any machine code stored in any memory medium, such as RAM or ROM, and machine code stored on other devices (such as floppy disks, flash memory, or a CDROM, for example). Software can include source or object code, for example. In addition, software encompasses any set of instructions capable of being executed in a client machine or server.

Furthermore, embodiments of the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, a semiconductor system (or apparatus or device), or a propagation medium.

Data structures are defined organizations of data that may enable an embodiment of the present disclosure. For example, a data structure may provide an organization of data, or an organization of executable code. Data signals could be carried across transmission mediums and store and transport various data structures, and, thus, may be used to transport an embodiment of the present disclosure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

In one exemplary aspect, the present disclosure is directed to a method of identifying defects. The method includes producing, with an imaging system, an original image of a fabricated article having a feature thereon, the feature having an intended height and extracting a contour image from the original image, the contour image having an outline of those portions of the feature having a height approximate to the intended height. The method also includes producing a simulated image of the article based upon the contour and creating a defect image based on the differences between the simulated image and the original image, the defect image including any portions of the feature having a height less than the intended height.

In another exemplary aspect, the present disclosure is directed to a method of identifying defects. The method includes scanning a fabricated article with a scanning electron microscope (SEM) to produce an SEM image of the article and defining an intensity threshold associated a height of features on the fabricated article. The method also includes extracting a contour from the SEM image based on the intensity threshold, the contour including outlines of portions of the SEM image that met the intensity threshold and producing a simulated SEM image of the fabricated article based upon the contour, the simulated SEM image including the portions of the SEM image outlined in the contour. Additionally, the method includes comparing the simulated SEM image with the SEM image to produce a defect image that includes any portions of the SEM image that did not meet the threshold.

In yet another exemplary aspect, the present disclosure is directed to a defect inspection system. The system includes an imaging system operable to scan and produce an image of a fabricated article having a feature thereon, the feature having an intended height, a processor, a communication module communicatively coupled to the processor and configured to receive the image of the fabricated article from the imaging system, and a non-transitory, computer-readable storage communicatively coupled to the processor and including instructions executable by the processor. The instructions include instructions to extract a contour image from the original image, the contour image having an outline of those portions of the feature having a height approximate to the intended height and instructions to produce a simulated image of the fabricated article based upon the contour. Additionally, the instructions include instructions to create a defect image based on the differences between the simulated image and the original image, the defect image including any portions of the feature having a height less than the intended height.

What is claimed is:

1. A method of identifying defects, comprising:
producing, with an imaging system, an original image of a fabricated article having a feature thereon, the feature having an intended height;
extracting a contour image from the original image, the contour image having an outline of those portions of the feature having a height approximate to the intended height;
producing a simulated image of the article based upon the contour image; and
creating a defect image based on the differences between the simulated image and the original image, the defect image including any portions of the feature having a height less than the intended height.

2. The method of claim 1, wherein the creating the defect image identifies any non-full-height defects depicted in the original image without identifying any full-height defects.

3. The method of claim 2, further including classifying any non-full-height defects identified in the defect image into at least soft defects and hard defects.

4. The method of claim 1, wherein the creating the defect image identifies any foreign particles disposed on the fabricated article.

5. The method of claim 1, wherein the creating the defect image includes performing a pixel-by-pixel comparison of the simulated image and the original image and basing pixel values of the defect image on the differences identified by the pixel-by-pixel comparison.

6. The method of claim 1, wherein the fabricated article is a photomask.

7. The method of claim 1, wherein the producing the original image is performed with a scanning electron microscope.

8. A method of identifying defects, comprising:
scanning a fabricated article with a scanning electron microscope (SEM) to produce an SEM image of the fabricated article;
defining an intensity threshold associated with a height of features on the fabricated article;
extracting a contour from the SEM image based on the intensity threshold, the contour including outlines of portions of the SEM image that met the intensity threshold;
producing a simulated SEM image of the fabricated article based upon the contour, the simulated SEM image including the portions of the SEM image outlined in the contour; and
comparing the simulated SEM image with the SEM image to produce a defect image that includes any portions of the SEM image that did not meet the intensity threshold.

9. The method of claim 8,
wherein the SEM image includes a first plurality of pixels, each of the first plurality of pixels having a gray scale value;
wherein the simulated SEM image includes a second plurality of pixels, each of the second plurality of pixels having a gray scale value; and
wherein the comparing includes finding the difference between the gray scale value of each pixel in the first plurality of pixels and the gray scale value of each corresponding pixel in the second plurality of pixels.

10. The method of claim 9, wherein the defect image includes a third plurality of pixels, each of the third plurality of pixels having a gray scale value corresponding to the difference between the gray scale value of each pixel in the first plurality of pixels and the gray scale value of each corresponding pixel in the second plurality of pixels.

11. The method of claim 8, wherein defining the intensity threshold includes selecting a gray scale value representative of the height.

12. The method of claim 8, wherein the scanning electron microscope is an electron-beam inspection tool.

13. The method of claim 8, wherein the any portions of the SEM image that did not meet the threshold are non-full-height defects in the fabricated article depicted in the SEM image.

14. The method of claim 13, wherein the non-full-height defects include particle defects and non-full-height structural defects.

15. The method of claim 13, further including classifying the non-full-height defects into at least soft and hard defects.

16. The method of claim 8, wherein the defect image is free of depictions of full-height defects.

17. A defect inspection system, comprising:
an imaging system operable to scan and produce an image of a fabricated article having a feature thereon, the feature having an intended height;
a processor;
a communication module communicatively coupled to the processor and configured to receive the image of the fabricated article from the imaging system; and
a non-transitory, computer-readable storage communicatively coupled to the processor and including instructions executable by the processor, the instructions including:
instructions to extract a contour image from the image, the contour image having an outline of those portions of the feature having a height approximate to the intended height;
instructions to produce a simulated image of the fabricated article based upon the contour image; and
instructions to create a defect image based on the differences between the simulated image and the image, the defect image including any portions of the feature having a height less than the intended height.

18. The defect inspection system of claim 17, wherein the instructions to create a defect image include instructions to identify any non-full-height defects depicted in the image without identifying any full-height defects.

19. The defect inspection system of claim 17, wherein the imaging system is a scanning electron microscope and the fabricated article is a photomask.

20. The defect inspection system of claim 17, wherein the instructions to create the defect image include instructions to perform a pixel-by-pixel comparison of the simulated image and the image and instructions to select pixel values for the defect image based on the differences identified by the pixel-by-pixel comparison.

* * * * *